(12) United States Patent
Rietzler

(10) Patent No.: US 7,059,535 B2
(45) Date of Patent: Jun. 13, 2006

(54) BINDING SUBSTRATE FOR A DOCUMENT FOR PERSONAL IDENTIFICATION AND METHOD FOR ITS PRODUCTION

(75) Inventor: Manfred Rietzler, Marktoberdorf (DE)

(73) Assignee: Intec Holding GmbH (DE)

( * ) Notice: Subject to any disclaimer, the term of this patent is extended or adjusted under 35 U.S.C. 154(b) by 96 days.

(21) Appl. No.: 10/744,306

(22) Filed: Dec. 22, 2003

(65) Prior Publication Data
US 2005/0060637 A1    Mar. 17, 2005

(30) Foreign Application Priority Data
Aug. 18, 2003   (DE) ................... 103 38 444

(51) Int. Cl.
*G06K 19/06* (2006.01)

(52) U.S. Cl. ..................... 235/492

(58) Field of Classification Search ........... 235/492, 235/380, 442, 443, 493, 495, 382, 487
See application file for complete search history.

(56) References Cited

U.S. PATENT DOCUMENTS

| | | | | |
|---|---|---|---|---|
| 4,625,102 A | * | 11/1986 | Rebjock et al. | 235/492 |
| 6,100,804 A | * | 8/2000 | Brady et al. | 340/572.7 |
| 6,222,452 B1 | * | 4/2001 | Ahlstrom et al. | 340/572.1 |
| 6,595,418 B1 | * | 7/2003 | Igarashi et al. | 235/385 |
| 6,843,422 B1 | * | 1/2005 | Jones et al. | 235/492 |
| 2003/0134080 A1 | * | 7/2003 | Foster | 428/77 |
| 2003/0234286 A1 | * | 12/2003 | Labrec et al. | 235/380 |
| 2004/0143505 A1 | * | 7/2004 | Kovach | 705/23 |

* cited by examiner

*Primary Examiner*—Thien M. Le
*Assistant Examiner*—Thien Mai
(74) *Attorney, Agent, or Firm*—McGlew & Tuttle, PC

(57) ABSTRACT

A transponder inlay for a document for personal identification is provided which has at least one ID page with a layered construction. The layered construction has a transponder substrate for positioning a transponder unit, and includes a chip unit and an antenna, and two inlay cover layers, which receives the transponder substrate between them. The transponder substrate is formed from a thermoplastic, and the inlay cover layers are made of a foamed plastic.

30 Claims, 6 Drawing Sheets

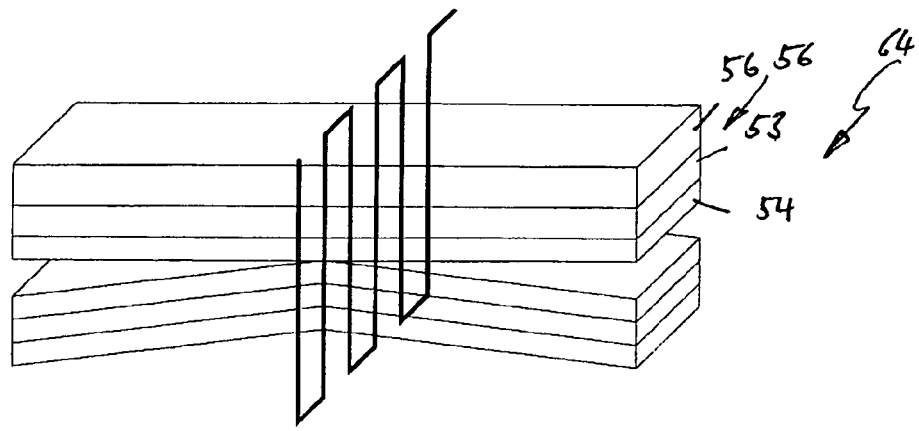
FIG.7
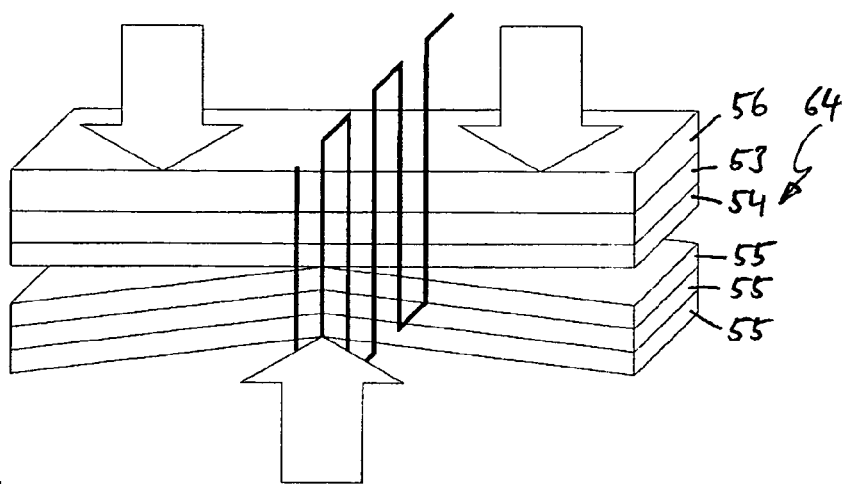
FIG.8
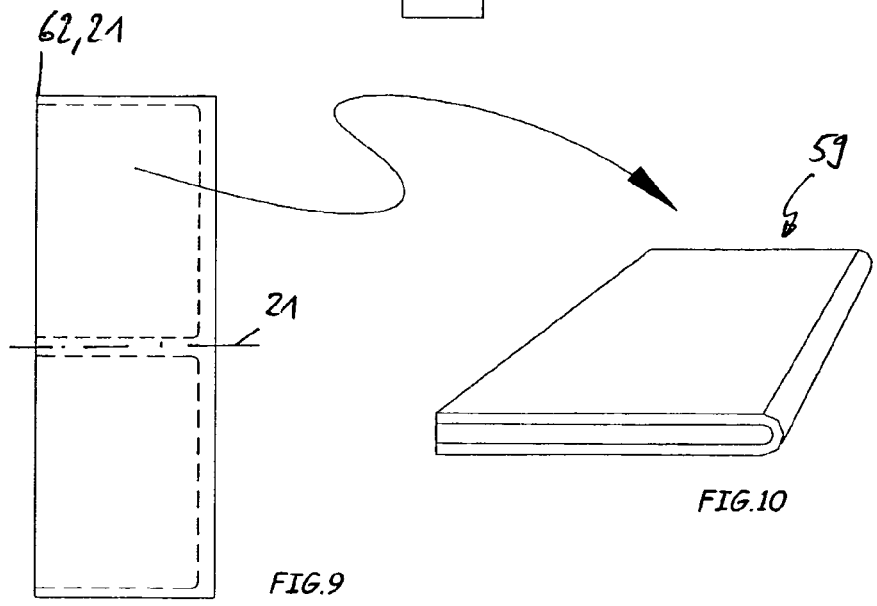
FIG.9
FIG.10

BINDING SUBSTRATE FOR A DOCUMENT FOR PERSONAL IDENTIFICATION AND METHOD FOR ITS PRODUCTION

CROSS REFERENCE TO RELATED APPLICATIONS

This application claims the benefit of priority under 35 U.S.C. § 119 of German Application DE 103 38 444.8 filed Aug. 18, 2003.

FIELD OF THE INVENTION

The present invention relates to a transponder inlay for a document for personal identification having at least one ID page according to the preamble of claim 1, as well as a document for personal identification which is produced using a transponder inlay of this type. Furthermore, the invention relates to a method for producing a transponder inlay, as well as a method for producing a document for personal identification using a transponder inlay of this type.

BACKGROUND OF THE INVENTION

Particularly because of continually increasing security requirements, there are currently manifold attempts to improve existing systems for personal identification or to provide novel identification possibilities which allow simpler and faster acquisition of person-specific data for personal identification. Since, particularly in the field of personal documents to be carried by persons, there are very different standards in regard to data acquisition, it has been shown to be necessary not to do away with conventional personal identification systems, such as the personal ID card, but rather to modify the existing system in such a way that more advanced systems, such as personal recognition via transponders, for example, are additionally applied.

One possibility for implementing dual identification systems of this type is certainly to retrofit a conventional personal ID card with a supplemental transponder, on which, in correspondence with the personal data shown in the security stamp of the ID paper, the data is stored in the chip module of the transponder and may be called without contact using a suitable reading device. A supplemental external application of a personal identification transponder provides an unsatisfactory result, however, particularly in regard to security from forgery, since it appears easy to remove or replace an identification transponder applied externally to a personal document.

In addition, it is also to be possible for dual identification systems of this type to be implementable by the manufacturers who have been certified up to this point for producing ID systems. Therefore, the requirement also results that the additional equipping of a personal ID card with a personal identification transponder is to be integratable in the simplest possible way into a method for producing conventional personal ID cards.

SUMMARY OF THE INVENTION

The present invention is therefore based on the object of providing a possibility for integrating the additional function of contactless data access into a conventional personal ID card in such a way that both the security from forgery and the production are impaired as little as possible by it.

The transponder inlay according to the present invention, for a document for personal identification having at least one ID page, has a layered construction having a transponder substrate for situating a transponder unit, including a chip unit and an antenna, and two inlay cover layers which receive the transponder substrate between them, the transponder substrate being produced from a thermoplastic and the inlay cover layers being made from a foamed plastic.

Therefore, the transponder inlay according to the present invention allows, for example, the substitution of a known intermediate layer of the book cover binding, frequently implemented as a cardboard layer, provided in a conventional personal ID card. The transponder inlay according to the present invention therefore also allows the production of a personal ID card having an expanded transponder function, without an externally visible change of the personal ID card being connected therewith. Simultaneously, the identification transponder is positioned in the personal ID card in such a way that it may not be removed or replaced without destroying the personal ID card. In addition, the construction of the transponder inlay according to the present invention allows method sequences during the production of a corresponding personal ID card which are comparable to those of the production of a conventional personal ID card.

Firstly, the above-mentioned combination allows especially good adhesion of the layers to one another because of penetration of the thermoplastic material of the transponder substrate into the pores of the foamed plastic during a lamination process. Secondly, in a subsequent method step for implementing a book cover binding based on the binding substrate, the cover layers may be bonded to the bonding layers by an especially durable adhesive bond because of the porosity of the foamed plastic.

High stability and tear resistance are achieved if the transponder substrate is produced using a polyimide or a polyimide derivative.

If the transponder substrate has a fabric structure, the stability and tear resistance in different directions are increased even further. In addition, a fabric structure may be sewn or glued to further layers especially durably. This is particularly true for a nylon fabric.

A polyolefin foam is especially suitable for use for the inlay cover layers. Paper-like material properties may particularly be achieved if a polyethylene foam having silicon dioxide as a filler is used.

It has also been shown to be especially advantageous if the transponder inlay forms an ID page or is implemented in an ID page.

If the inlay cover layer positioned diametrically opposite a chip housing has a window opening for at least partially receiving the chip housing, the transponder inlay may be produced in the slightest possible thickness in spite of the supplementation of the transponder substrate with the inlay cover layers.

Depending on the type of implementation of the transponder substrate and particularly if the transponder substrate is provided with a window opening for receiving a chip housing, it may be advantageous for receiving the chip in a secure, hermetically sealed way to provide a seal layer diametrically opposite the chip housing between the transponder substrate and the inlay cover layer.

If the window opening of the inlay cover layer is filled up, using a partial region of the transponder substrate and/or the seal layer covering the chip housing, so its surface is flush with a top of the inlay cover layer, an implementation which is plane-parallel overall in regard to the surfaces of the transponder inlay results, allowing the application of extremely thin binding cover layers without the danger arising that the chip will stand out in the surface.

Particularly with a multilayer implementation of the transponder substrate and positioning of the chip unit between the layers thus made possible, especially secure, hermetic sealing may be achieved.

If the transponder inlay has at least one reduction in cross-section along a folding axis for definition of a book spine, folding over both page regions of the transponder inlay is possible even with a relatively stiff implementation of the transponder inlay and/or of the transponder substrate.

It is advantageous if the inlay cover layers are provided with an inner and an outer binding cover layer to implement a book cover binding. The document for personal identification according to the present invention, having at least one ID page positioned in a book cover binding, has at least one ID page having a transponder inlay.

Alternatively, the document for personal identification according to the present invention having at least one ID page positioned in a book cover binding has a book cover binding, implemented as multilayered, having a transponder inlay of the above-mentioned type positioned therein.

It has been shown to be especially advantageous if the transponder inlay and the at least one ID page are bonded, particularly along a folding axis of the binding substrate, using a seam, since the seam may be used as an additional security device against forgery and/or improper manual access to the transponder device. Thus, for example, it is especially advantageous if at least one coil of the antenna of the transponder device is positioned in such a way that it crosses the course of the seam, so that the attempt to remove the transponder from the composite between the transponder inlay and the ID pages leads to destruction of the antenna.

Direct assignment of the transponder inlay to the binding may be achieved if the transponder inlay is glued to the outer binding cover layer and the inner binding cover layer is bonded to the at least one ID page using a seam.

In an advantageous refinement, an adhesive composite formed from the transponder inlay and the external binding cover layer is glued to a sewn composite formed from the inner binding cover layer and the at least one ID page.

If the transponder inlay has an antenna and/or a chip unit which is implemented to show through the inner and/or outer binding cover layers, it may be used to define an external identification or security feature, particularly if the antenna or the chip unit has an identification shape recognizable from the outside.

In the method according to the present invention for producing a transponder inlay for a document for personal identification of the preceding type, a transponder unit having a chip unit and an antenna is positioned on a transponder substrate made of a thermoplastic material, the transponder substrate is provided on both sides with an inlay cover layer made of a foamed plastic, and, in a subsequent lamination process, the transponder substrate is bonded to the inlay cover layers in such a way that a transponder inlay having plane-parallel contact surfaces results.

Particularly in the case in which the chip unit is positioned in a window opening of the transponder substrate, it is advantageous if a seal layer made of a thermoplastic is applied diametrically opposite a chip housing before application of the inlay cover layer.

In the method according to the present invention for producing a document for personal identification using a transponder inlay of the preceding type, the transponder inlay is provided with an inner binding cover layer, and subsequently the inner binding cover layer is provided with at least one ID page.

It is especially advantageous if the at least one ID page is bonded to the book cover binding using a seam to produce a book cover/page composite.

An especially cost-effective production is possible if the production of the book cover binding and/or the production of the book cover/page composite is performed using panel sheets, in such a way that a cover layer panel sheet having a corresponding number of cover layer units is applied to a transponder inlay panel sheet, produced according to the lamination method, having multiple transponder inlays implemented therein, and subsequently multiple ID page panel sheets are positioned on the cover layer panel sheet, having multiple inner cover layers, to implement a panel sheet composite having multiple book cover/page composite units.

If, following the production of the panel sheet composite having multiple book cover/page composite units, the book cover/page composite units are isolated from the panel sheet composite, parallel production of a number of documents corresponding to the division of the panel sheets may occur.

In an alternative method for producing a transponder inlay for a document for personal identification, the transponder inlay is provided with an outer binding cover layer to implement an outer binding cover layer/transponder inlay composite, and the inner binding cover layer is provided with at least one ID page to implement an inner binding cover layer/ID page composite. Subsequently, the outer binding cover layer/transponder inlay composite is glued to the inner binding cover layer/ID page composite.

It is especially advantageous if the outer binding cover layer/transponder inlay composite is produced by gluing and the inner binding cover layer/ID page composite is produced using a seam.

In the following, preferred exemplary embodiments of the transponder inlay and/or a book cover binding produced using the transponder inlay for producing a document for personal identification are described in greater detail on the basis of the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 7 is a perspective view showing the positioning of the outer cover layer panel sheet on the transponder inlay panel sheet to implement a panel sheet composite;

FIG. 8 is a perspective view showing the folding of two page regions of the panel sheet composite around a folding axis running in the direction of the seam;

FIG. 9 is a top view showing the isolation of personal documents out of a panel composite having two document units;

FIG. 10 is a perspective view showing the isolation of personal documents out of a panel composite having two document units;

DESCRIPTION OF THE PREFERRED EMBODIMENT

Figure 1:
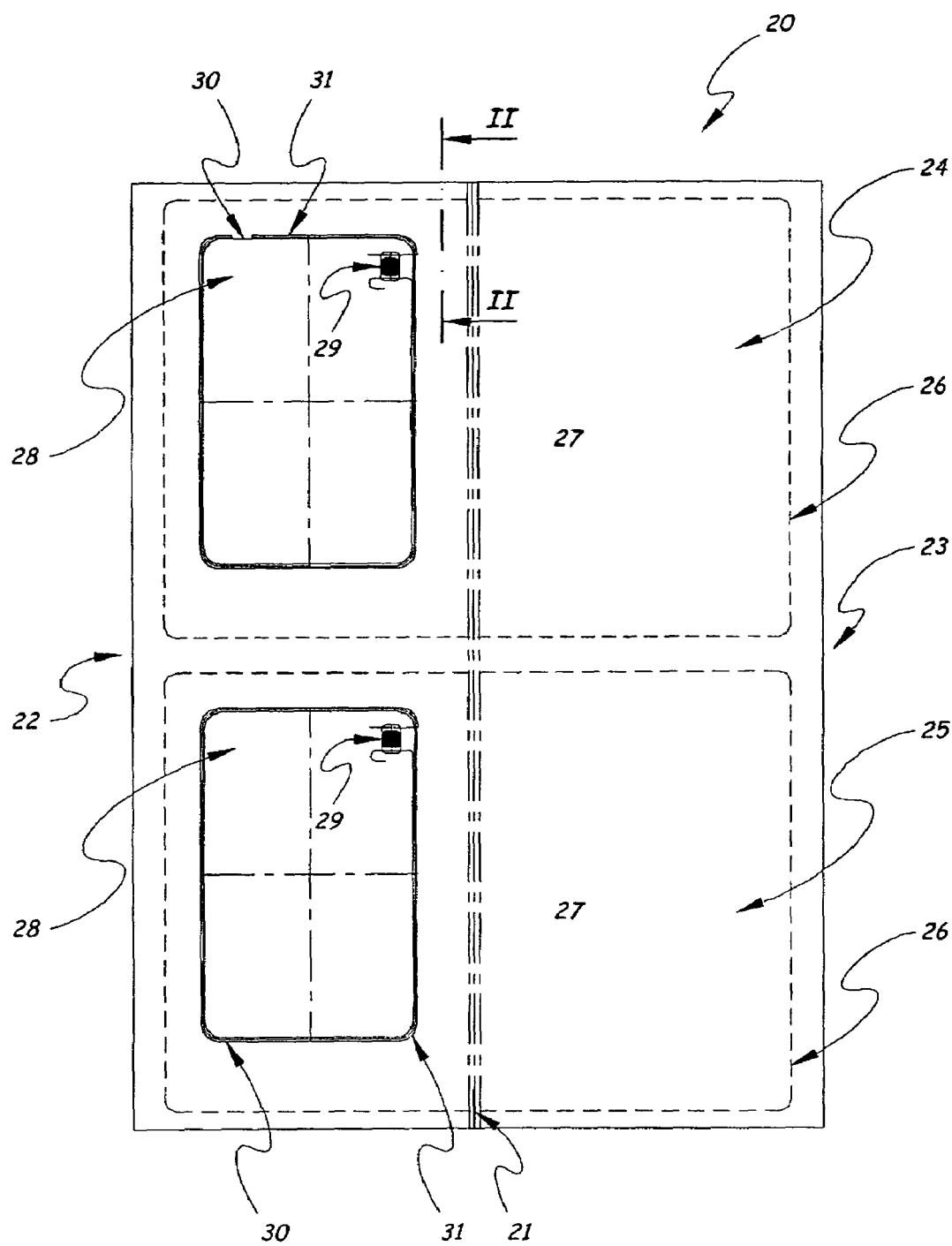
FIG. 1 is a top view showing a panel sheet having two transponder substrates.

Referring to the drawings in particular, FIG. 1 shows a panel sheet 20, which is divided by a folding axis 21 into two page regions 22, 23, which may also be implemented unequally. Transversely to the folding axis 21, two neighboring double leaf blanks 24, 25 extend, each running from the left page region 22 into the right page region 23, having outlines 26 which are shown by the dashed line shape.

The two identically implemented double leaf blanks 24, 25 are each implemented as a transponder substrate 27, each of which is provided in the left page region 22 with a transponder unit 28. The transponder unit 28 includes a chip 29 and an antenna 30 in contact therewith which is implemented in the exemplary embodiment shown as a wire antenna made from an antenna wire 31 laid on the surface of the transponder substrate. Other types of antenna implementation, in printing or etching technology, for example, are also possible.

Figure 2A:
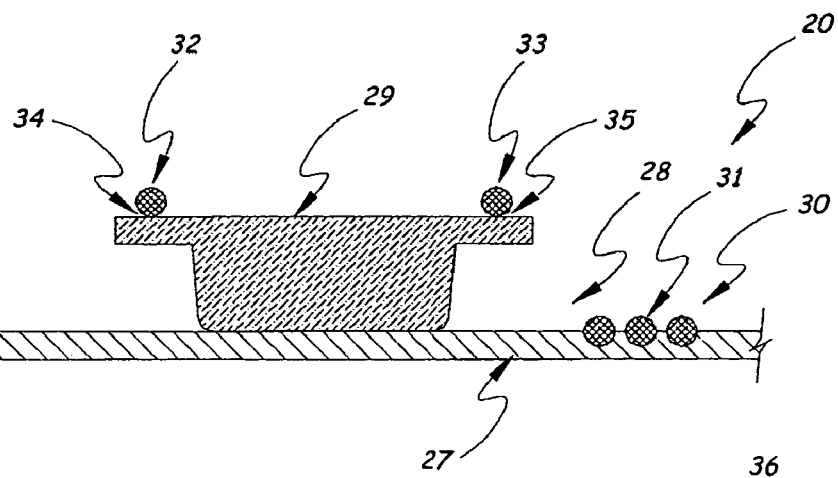
FIG. 2a is a sectional view for showing the production of a transponder inlay in a first exemplary embodiment.

FIG. 2a shows a partial sectional view of the transponder substrate 27 along the section line course II—II in FIG. 1 during the positioning of the transponder unit 28 on the transponder substrate 27. In the case of the method sequence shown in FIGS. 2a through 2c, the transponder substrates 27 implemented in the panel sheet 20 are implemented as closed, i.e., windowless, and the chip 29 is applied to the surface of the transponder substrate 27 to produce the transponder unit 28. Subsequently—if the antenna 30 is implemented as a wire antenna—the antenna wire 31 is laid in multiple antenna coils with subsequent contacting of wire ends 32, 33 of the antenna 30 to external contacts 34, 35 of the chip 29.

Figure 2B:
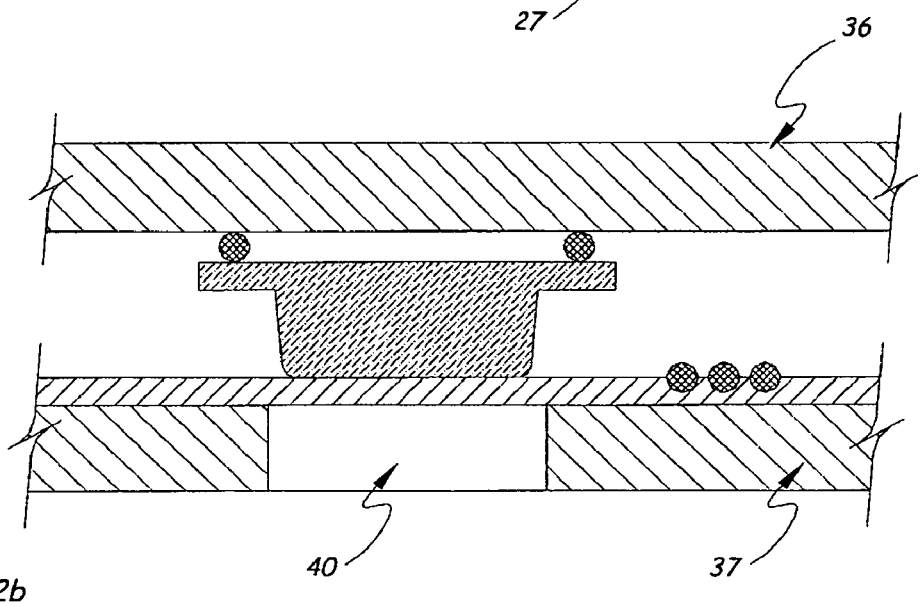
FIG. 2b is a sectional view for showing the production of a transponder inlay in a first exemplary embodiment.

The panel sheet 20, made of a thermoplastic material, such as polycarbonate, polypropylene, PET, or a polyimide, having the transponder substrates 27 implemented therein, is subsequently covered on each side with a panel sheet 36, 37 made of a foamed plastic, such as a foamed polyethylene having silicon dioxide as a filler, which has paper-like properties. As is also visible from FIG. 2b, the panel sheet 36, which is used to implement an inlay cover layer 38 on the transponder substrate 27, is provided with a closed surface, while in contrast the panel sheet 37, which is used to implement an inlay cover layer 39 on the diametrically opposite side of the transponder substrate 27, is provided with window openings 40. The layered construction shown in FIG. 2b is processed in a laminator (not shown in greater detail here) into a transponder inlay 41 shown in FIG. 2c. During the lamination process, a protuberance 43, which is tailored to the shape of a chip housing 42 of the chip module 29 and projects into the window 40 of the inlay cover layer 39, forms in the contact substrate 27 because of the effect of temperature and pressure. Because of the effect of heat during the lamination process, the transponder substrate 27 is also softened on the surface, with the result that in boundary layers 59 implemented between the transponder substrate 27 and the inlay cover layers 38, 39, the thermoplastic material of the transponder substrate 27 penetrates into cavities of the inlay cover layers 38, 39, produced from a porous, elastic plastic material, and after solidification leads to anchoring of the inlay cover layers 38, 39 on the surfaces of the transponder substrate 27. Because of the porous and elastic implementation of the plastic material of the bonding layers 38, 39, regions of the transponder unit 28 projecting out of the plane of the transponder substrate 27, such as the antenna wire 31 and a chip carrier 44 of the chip 29 provided here, penetrate into the inlay cover layer 38 with elastic deformation, without standing out on a free contact surface 45 of the inlay cover layer 38.

Figure 2C:
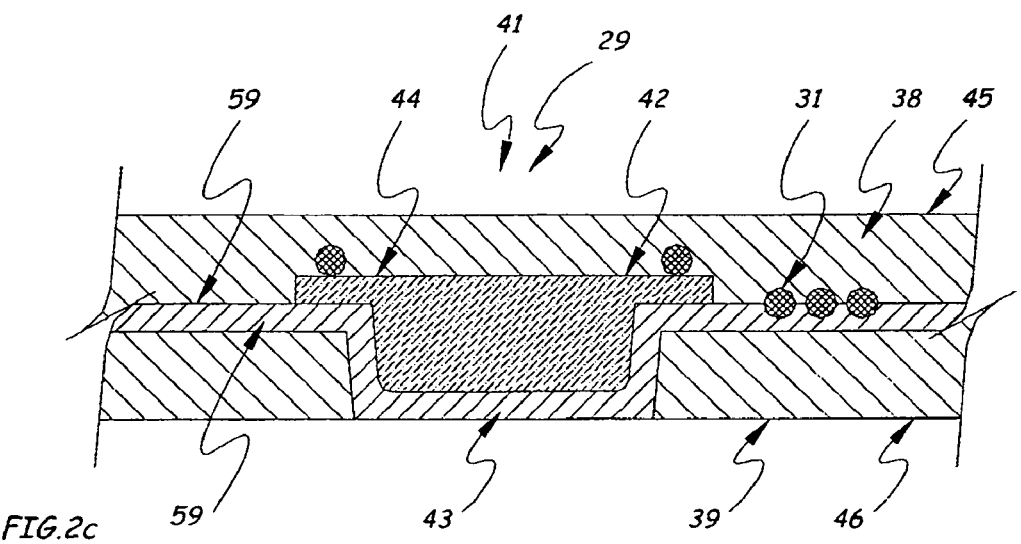
FIG. 2c is a sectional view for showing the production of a transponder inlay in a first exemplary embodiment.

As FIG. 2c shows, the result of the lamination process is a transponder inlay 41 having plane-parallel contact surfaces 45, 46.

Figure 3A:
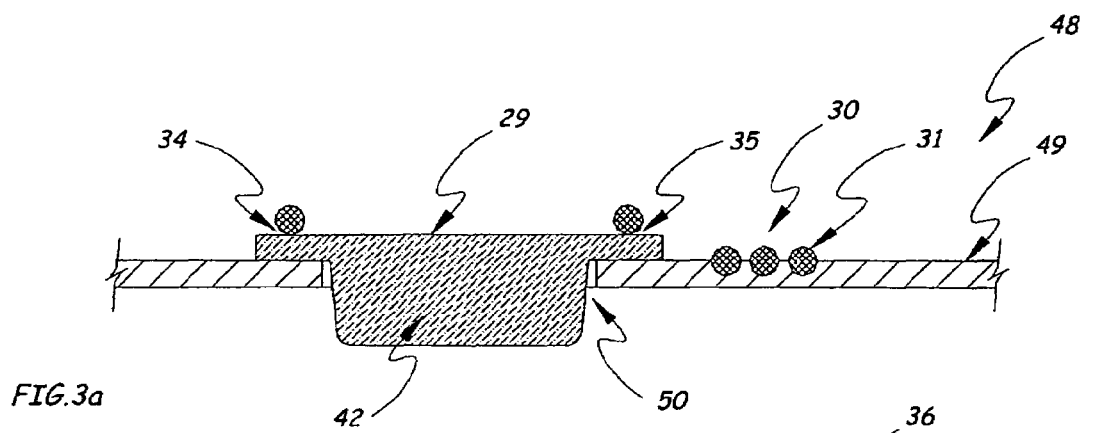
FIG. 3a is a sectional view for showing the production of a transponder inlay in a second exemplary embodiment.
Figure 3B:
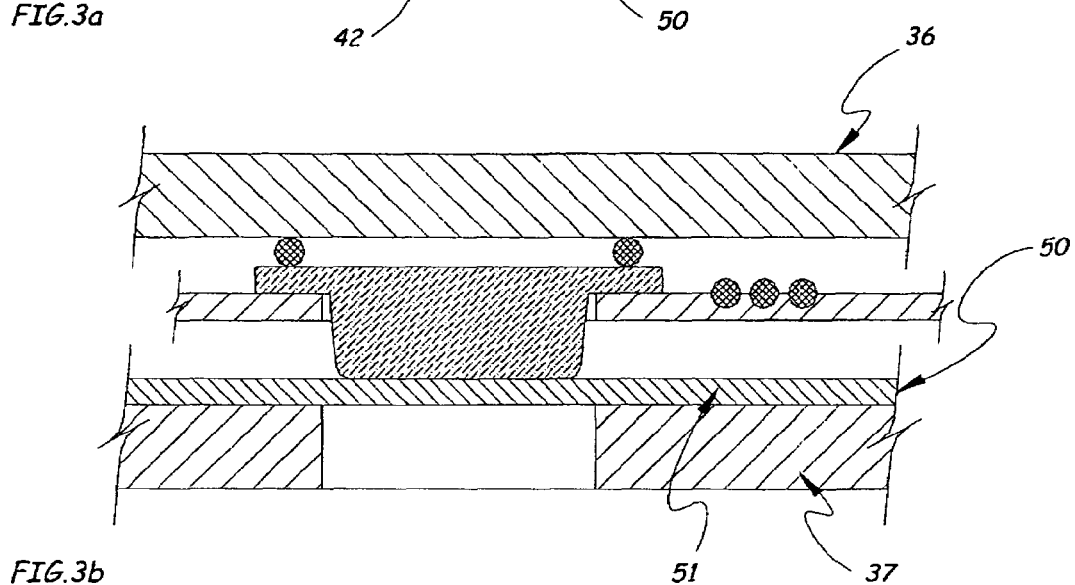
FIG. 3b is a sectional view for showing the production of a transponder inlay in a second exemplary embodiment.
Figure 3C:
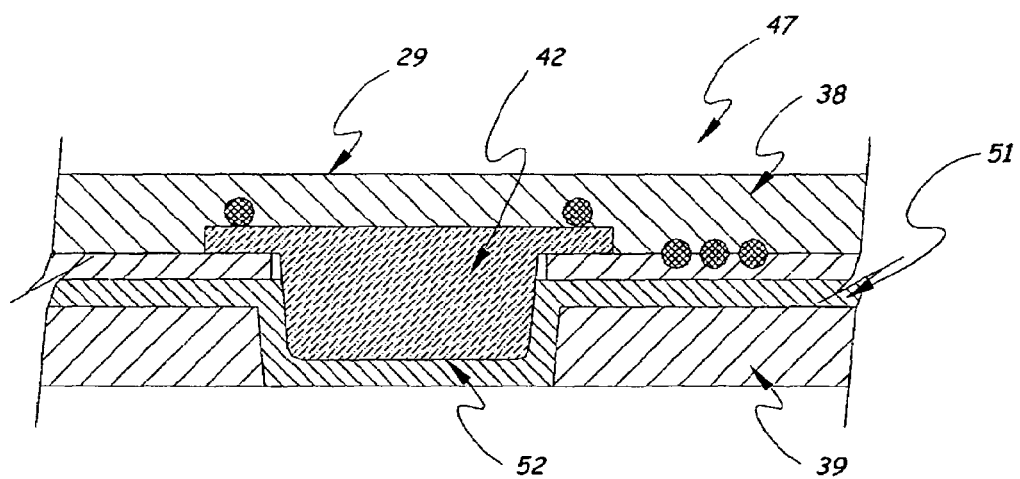
FIG. 3c is a sectional view for showing the production of a transponder inlay in a second exemplary embodiment.

In FIGS. 3a through 3c, an alternative embodiment of the production of a transponder inlay 47 is shown, elements corresponding in their embodiment in FIGS. 3a through 3c with the elements in FIGS. 2a through 2c being provided with corresponding identification numbers.

FIG. 3a shows a partial sectional illustration of a panel sheet 48, which, in contrast to the panel sheet 20, includes two transponder substrates 49, each of which is provided with a window opening 50. The window opening 50 allows positioning of the chip 29 on the transponder substrate 49 with chip housing 42 received countersunk in the window opening 50. After corresponding application of the chip 29, the antenna wire 31 is laid in a way already described with reference to FIG. 2a to implement an antenna 30 contacting the chip 29 in external contacts 34, 35.

As shown in FIG. 3b, the transponder substrate 49 is subsequently covered on top with a panel sheet 36 made of the previously described porous, elastic plastic material. A panel sheet 50, including two seal layers 51 assigned to each of the transponder substrates 49, which are each made of a thermoplastic like the transponder substrate 49, is positioned on the bottom of the transponder substrate 49. Subsequently, a panel sheet 37 made of the porous, elastic plastic material described above is applied to the panel sheet 50 having the seal layers 51.

The layered arrangement shown in FIG. 3b is subsequently processed in a laminator into a laminate, a protuberance 52 corresponding to the shape of the chip housing 42 now being implemented in the seal layers 51. The protuberance 52 projects into the window opening 40 of the lower inlay cover layer 39 in this case.

Figure 4:
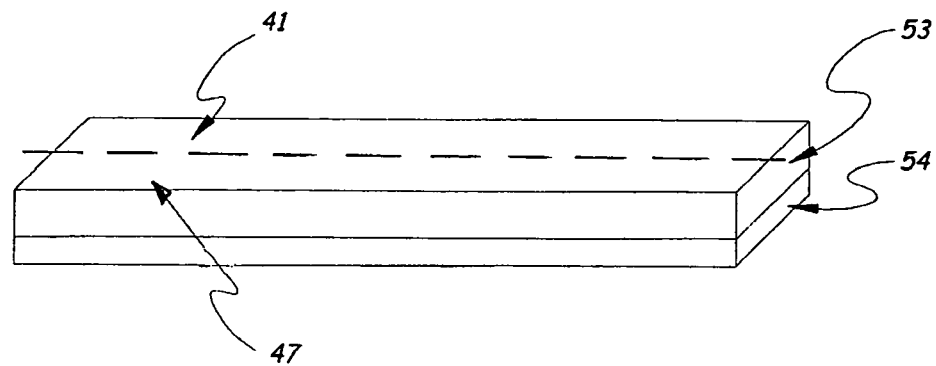
FIG. 4 is a perspective view showing the positioning of an inner cover layer panel sheet on a transponder inlay panel sheet.
Figure 5:
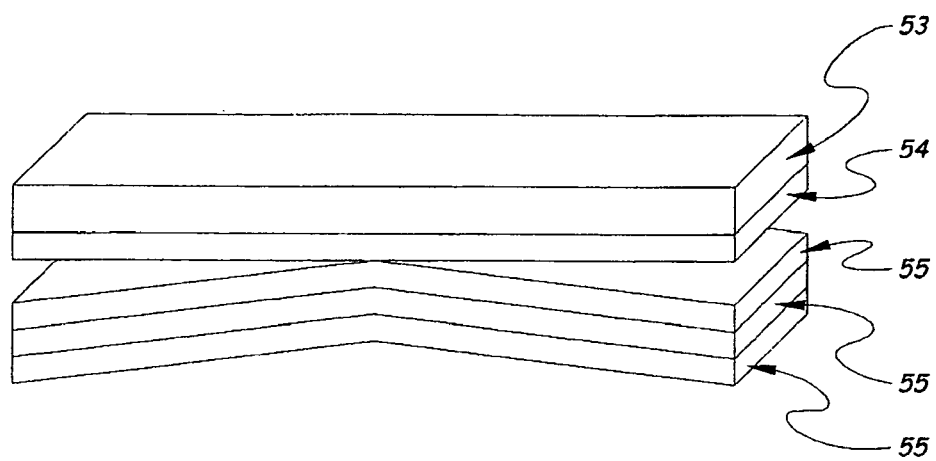
FIG. 5 is a perspective view showing the positioning of multiple ID page panel sheets on the inner cover layer panel sheet.

The result of the method sequence illustrated in FIGS. 2a through 2c and/or 3a through 3c is a binding substrate panel sheet 53 in laminate construction shown in FIG. 4, including two transponder inlays 41 and/or 47, which are provided with transponder units 28 (FIG. 1).

The transponder inlay panel sheet 53 is now provided on one surface with a cover layer panel sheet 54, as shown in FIG. 4, which includes two inner cover layers assigned to the transponder inlays, bonding through gluing suggesting itself as especially advantageous because of the porous inlay cover layers 39, since the porosity allows good adhesion of the adhesive.

If necessary, the transponder inlay panel sheet 53 may also be implemented as smaller or larger than the cover layer panel sheet 54.

Subsequently, multiple ID page panel sheets 55, each of which includes two ID double pages, are applied to the cover layer panel sheet 54, and bonded to one another and to the transponder inlay panel sheet 53, with the cover layer panel sheet 54 positioned between them, using a seam 62 along the central axis 21 also shown in FIG. 1, among other things.

Figure 6:
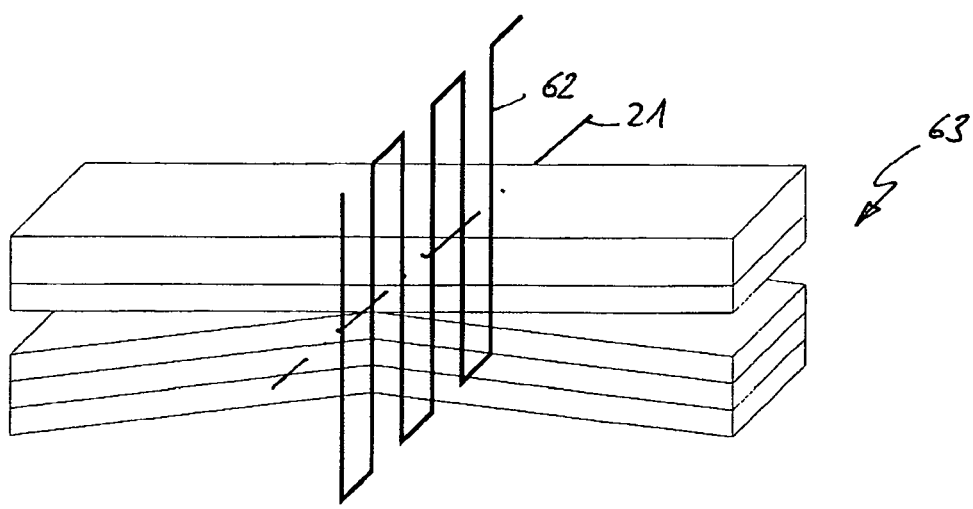
FIG. 6 is a perspective view showing the bonding of the ID page panel sheets to the composite made of transponder inlay panel sheets and inner cover layer panel sheets by a seam.

After production of a panel sheet composite 63 shown in FIG. 6, a cover layer panel sheet 56 is applied—also preferably in the gluing method—to the surface of the binding substrate panel sheet 53 diametrically opposing the cover layer panel sheet 54, as shown in FIG. 7, to produce a book cover/page composite 64, which subsequently, as shown in FIG. 8, may be converted by folding around the seam 62 and/or the central axis 21 into the configuration shown in FIG. 9, in which the two book cover/page composite units 57, 58 are implemented having page regions 22, 23 lying one on top of another (FIG. 1), so that by stamping the book cover/page composite units out of the layered composite shown in FIG. 9, two personal documents 59 corresponding to the illustration in FIG. 10 may be isolated.

To simplify the folding over of the layered composite shown in FIG. 8, it is possible to provide the transponder inlay panel sheet 53 (FIG. 4) with a cross-sectional taper along the central axis 21—for example, through corresponding shaping during the lamination process. This may be performed, for example, by using correspondingly implemented mold cores, implemented as an insert wire, for example, in the laminator.

Figure 11:
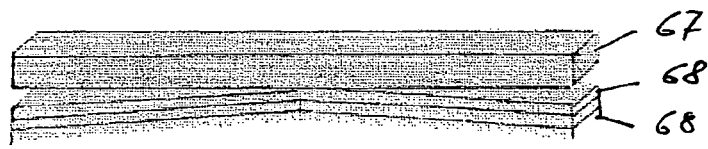
FIG. 11 is a perspective view showing the positioning of an inner cover layer panel sheet on multiple ID page panel sheets.
Figure 12:
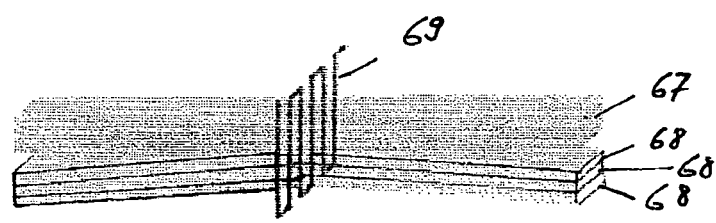
FIG. 12 is a perspective view showing the production of an inner cover layer/ID page composite.
Figure 13:
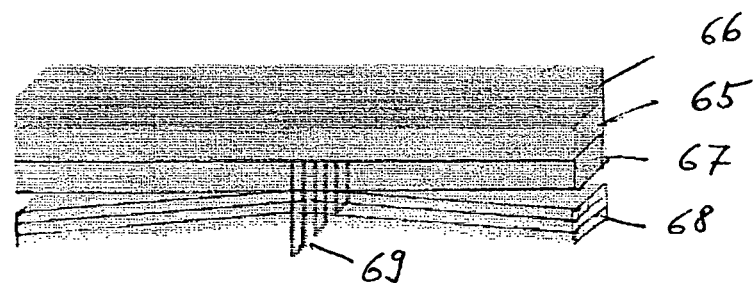
FIG. 13 is a perspective view showing the bonding of an outer cover layer/transponder inlay composite to the inner cover layer/ID page composite.
Figure 14:
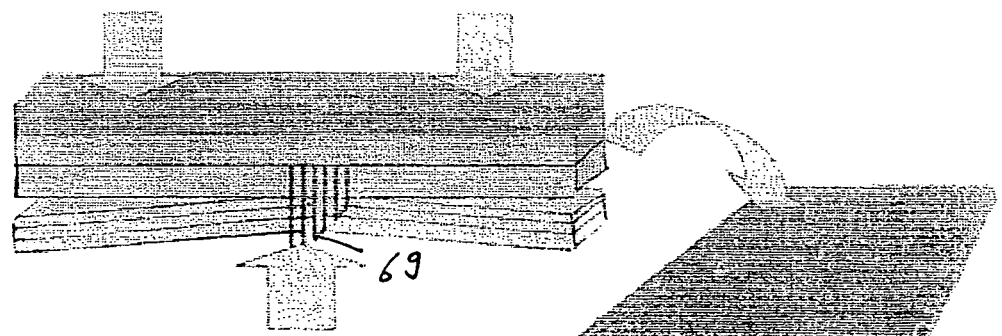
FIG. 14 is a top view showing the isolation of personal documents out of a panel composite having two document units.
Figure 15:
FIG. 15 is a perspective view showing the isolation of personal documents out of a panel composite having two document units.

A further production method is shown in FIGS. 11 through 15, in which, as FIG. 11 shows, an inner binding cover layer 67 and/or a corresponding panel sheet having multiple ID pages 68 and/or corresponding panel sheets are combined and, as shown in FIG. 12, bonded using a seam 69. As FIG. 13 shows, an outer binding cover layer/ID page composite 70, formed by gluing from the outer binding cover layer 66 and/or a corresponding panel sheet and the transponder inlay 65 and/or a corresponding panel sheet, is applied to the inner binding cover layer/ID page composite 71 thus formed and bonded by gluing. A book cover/page composite 72 thus formed is converted into the configuration shown in FIG. 15, corresponding to a personal document, by folding (FIG. 14) around the seam 69.

While specific embodiments of the invention have been shown and described in detail to illustrate the application of the principles of the invention, it will be understood that the invention may be embodied otherwise without departing from such principles.

The invention claimed is:

1. A transponder document inlay for a personal identification having at least one ID page, the document inlay comprising:
   a transponder unit including a chip unit and an antenna;
   an inner layer formed from a thermoplastic and defining a transponder substrate for positioning said transponder unit;
   a first inlay cover layer made of a foamed plastic with pores; and
   a second inlay cover layer made of a foamed plastic with pores, said transponder substrate being provided in contact with said transponder unit received thereon and said transponder substrate with said transponder unit received thereon cooperating with said first inlay cover layer and said second inlay cover layer to form a laminated layered construction with said transponder substrate with said transponder unit received thereon between said first inlay cover layer and said second inlay cover layer whereby the adhesion between said transponder substrate with said transponder unit received thereon, said first inlay cover layer and said second inlay cover layer resulting after lamination includes adhesion based on penetration of the thermoplastic of said transponder substrate into pores of said foamed plastic of each of said first inlay cover layer and said second inlay cover layer.

2. A transponder document inlay according to claim 1, wherein the transponder substrate is produced using a polyimide or a polyimide derivative.

3. A transponder document inlay according to claim 1, wherein the transponder substrate has a fabric structure.

4. A transponder document inlay according to claim 3, wherein the fabric structure has a nylon fabric.

5. A transponder document inlay according to claim 1, wherein at least one of said first inlay cover layers comprises a polyolefin foam.

6. A transponder document inlay according to claim 5, wherein at least one of said first inlay cover layer and said second inlay cover layer comprises a polyethylene foam.

7. A transponder document inlay according to claim 6, wherein the polyethylene foam has silicon dioxide as a filler.

8. A transponder document inlay according to claim 1, wherein said laminated layered construction forms the ID page or is implemented in the ID page.

9. A transponder document inlay according to claim 1, wherein said second inlay cover layer is positioned diametrically opposite a chip housing of said chip unit and has a window opening at least partially receiving said chip housing and the transponder document inlay has plane-parallel outer contact surfaces.

10. A transponder document inlay according to claim 1, further comprising a seal layer provided diametrically opposite a chip housing of said chip unit, between said transponder substrate and said second inlay cover layer.

11. A transponder document inlay according to claim 9, wherein the window opening of said second inlay cover layer is filled up with a partial region of the transponder substrate and/or a cover layer, which covers the chip housing, so a surface of said chip housing is flush with a top of the inlay cover layer.

12. A transponder document inlay according to claim 1, wherein the transponder substrate comprises multiple layers.

13. A transponder document inlay according to claim 1, wherein said laminated layered construction has at least one reduction in cross-section along a folding axis to define a folding edge.

14. A transponder document inlay according to claim 1, further comprising an inner binding cover layer on said first inlay cover layer and an outer binding cover layer on said second inlay cover layer to implement a book cover binding.

15. A transponder document inlay according to claim 1, wherein the ID page is positioned in a book cover binding, wherein the ID page is provided with said laminated layered construction.

16. A transponder document inlay according to claim 1, wherein the ID page is positioned in a book cover binding provided as a multilayer structure with said laminated layered construction positioned between an inner and an outer binding cover layer.

17. A transponder document inlay in combination according to claim 15, wherein said laminated layered construction and said ID page are bonded using a seam.

18. A transponder document inlay in combination according to claim 17, wherein at least one coil of said antenna crosses the course of said seam.

19. A transponder document inlay in combination according to claim 16, wherein said laminated layered construction is glued to said outer binding cover layer and said inner binding cover layer is bonded to the at least one ID page using a seam.

20. A transponder document inlay in combination according to claim 19, wherein an adhesive composite formed from said laminated layered construction and the outer binding cover layer is glued to a sewn composite formed from the inner binding cover layer and the at least one ID page.

21. A transponder document inlay in combination according to claim 16, wherein said antenna and/or said chip unit shows through said inner and/or said outer binding cover layer.

22. A transponder document inlay in combination according to claim 21, wherein said antenna and/or said chip unit has an identification shape which is recognizable from the outside.

23. A method for producing a transponder inlay for a document for personal identification, the method comprising the steps of:
providing a transponder unit including a chip unit and an antenna;
providing an inner layer formed from said thermoplastic and defining a transponder substrate for positioning a transponder unit;
providing a first inlay cover layer made of a foamed plastic with pores; and
providing a second inlay cover layer made of the foamed plastic with pores;
positioning the chip unit and the antenna on the substrate;
laminating the transponder substrate with said transponder unit received thereon, said first inlay cover layer and said second inlay cover layer to form a laminated layered construction with said transponder substrate with said transponder unit received thereon between said first inlay cover layer and said second inlay cover layer so the transponder substrate is bonded to the inlay cover layers forming a transponder inlay having plane-parallel outer contact surfaces and the bond between the transponder substrate with said transponder unit received thereon, said first inlay cover layer and said second inlay cover layer resulting after lamination includes interlayer adhesion based on penetration of the thermoplastic of said transponder substrate into pores of said foamed plastic of each of said first inlay cover layer and said second inlay cover layer.

24. The method according to claim 23, further comprising applying a seal layer made of a thermoplastic diametrically opposite a chip housing of said chip unit before laminating and before applying said second inlay cover layer.

25. A method according to claim 23, further comprising providing an inner binding cover layer on said laminated layered construction and subsequently providing the inner binding cover layer with at least one ID page.

26. The method according to claim 23, wherein the ID page is bonded to the laminated layered construction using a seam to produce a book cover/page composite.

27. The method according to claim 26, wherein the production of a book cover binding and/or the production of the book cover/page composite is performed using panel sheets in such a way that a cover layer panel sheet having a corresponding number of cover layers is applied to multiple laminated layered constructions and subsequently at least one ID page panel sheet is positioned on the cover layer panel sheet having multiple inner cover layer units to implement a panel sheet composite having multiple book cover/page composite units.

28. The method according to claim 27, wherein following the production of the panel sheet composite having multiple book cover/page composite units, the book cover/page composite units are isolated from the panel arrangement.

29. A method according to claim 23, wherein the laminated layered construction is provided with an outer binding cover layer to provide an outer binding cover to layer/laminated layered construction composite and the inner binding cover layer is provided with at least one ID page to provide an inner binding cover layer/ID page composite, and subsequently the outer binding cover layer/transponder inlay composite is glued to the inner binding cover layer/ID page composite.

30. The method according to claim 23, wherein the outer binding cover layer/laminated layered construction composite is produced through gluing and the inner binding cover layer/ID page composite is produced using a seam.

* * * * *